No. 845,466. PATENTED FEB. 26, 1907.
E. J. LANE.
DEVICE FOR TRANSMITTING POWER.
APPLICATION FILED AUG. 2, 1906.
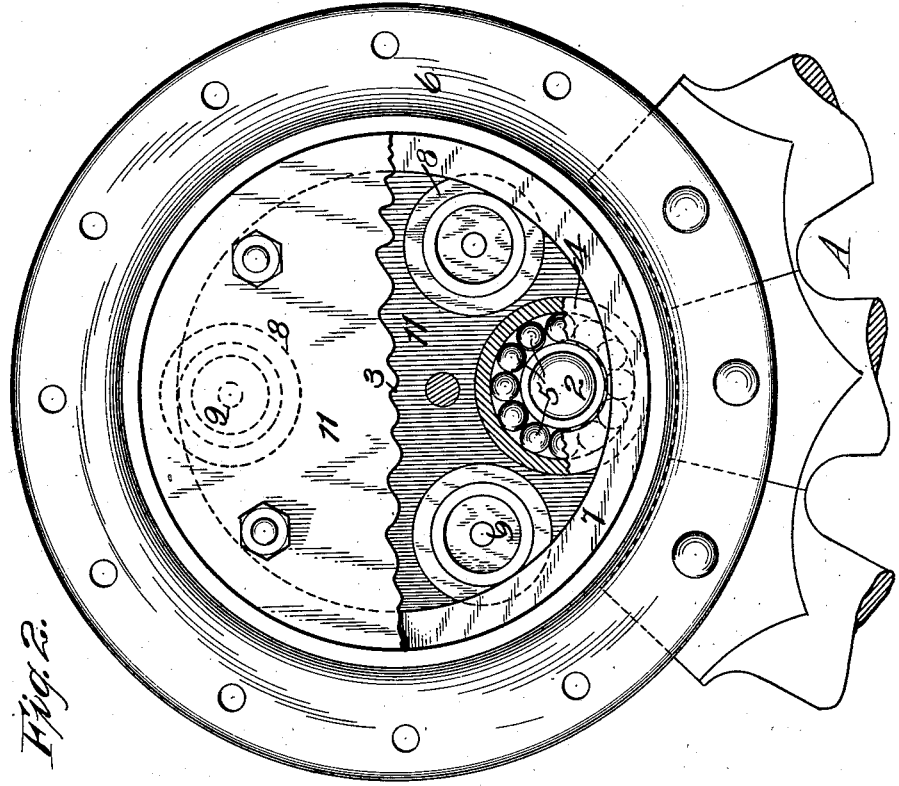
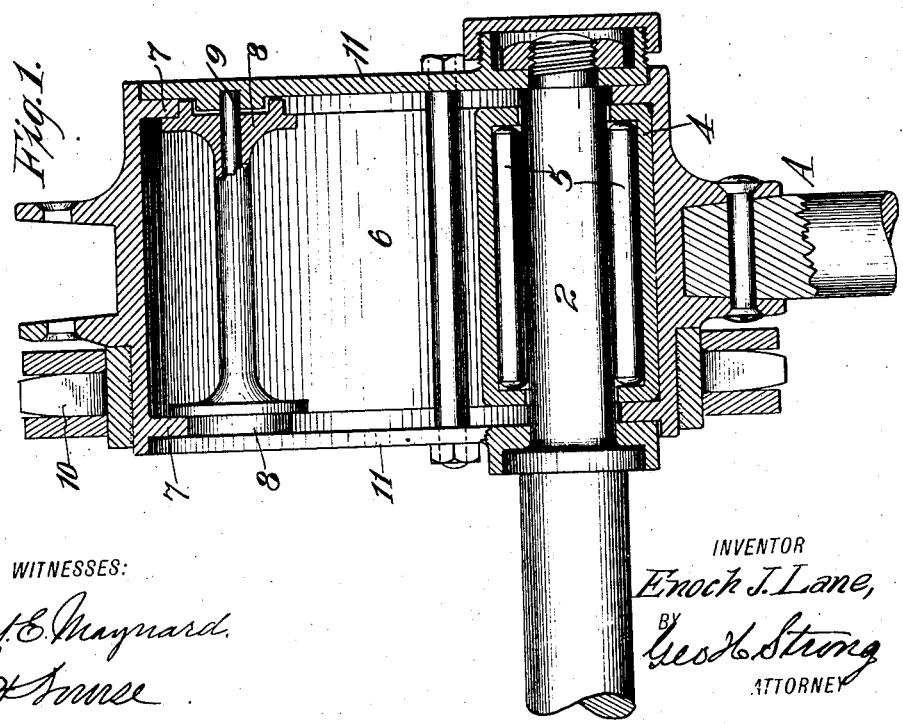
WITNESSES:
Fred E. Maynard.
INVENTOR
Enoch J. Lane,
BY
Geo. H. Strong
ATTORNEY

UNITED STATES PATENT OFFICE.

ENOCH J. LANE, OF WILLIAMS, CALIFORNIA, ASSIGNOR OF ONE-HALF TO W. R. GILMORE, OF WILLIAMS, CALIFORNIA.

DEVICE FOR TRANSMITTING POWER.

No. 845,466.　　　Specification of Letters Patent.　　　Patented Feb. 26, 1907.

Application filed August 2, 1906. Serial No. 328,846.

*To all whom it may concern:*

Be it known that I, ENOCH J. LANE, a citizen of the United States, residing at Williams, in the county of Colusa and State of California, have invented new and useful Improvements in Devices for Transmitting Power, of which the following is a specification.

My invention relates to a device which is especially designed to increase power in transmission.

It consists in a combination of parts and in details of construction, which will be more fully explained by reference to the accompanying drawings, in which—

Figure 1 is a vertical sectional view through the device. Fig. 2 is a side view, partly sectioned.

My invention may be applied in various ways; but whatever form it may take the load is carried upon an axle which is at one side either below or above the center, and the power is applied at a point distant from the center and upon the opposite side from the said axle.

I have here illustrated my invention as applied to driving a wheel A, having an axle 2, which, as here shown, is located below the center 3 of the wheel. This axle is mounted within a hollow roller 4, having sufficient interior diameter to admit the axle, which is here shown as surrounded by balls or rollers 5 to provide an antifrictional bearing between the two. The wheel A has a hollow hub 6, which may have an antifrictional collar 7 within it.

8 are rollers fitting within the hub and so disposed with relation to the roller 5 that their peripheries will roll around the inside of the collar or hub, and they serve as guides and auxiliaries to said roller, so that the wheel and its hub are maintained in proper relation with the rollers. These rollers are turnable upon shafts or spindles, as at 9, the ends of said spindles fitting into exterior disks or flanges 11, which close the ends of the hub and form thrust-bearings, by which the rollers are prevented from shifting out of place endwise.

In the present construction power will be applied from the opposite side of the center from the roller 4. In the present case I have shown it as applied by means of a sprocket-wheel 10, which may be driven by a chain passing over it from any suitable source of power, and the operation may be illustrated as follows: If the bottom periphery of the wheel be taken as a fulcrum-point and a weight be carried upon the shaft 2, which rests within the roller 4, and the latter traveling upon the lower interior of the hollow hub or shell, the power applied at the periphery of sprocket 10 will by reason of the greater distance from 2 to 10 than from the center 3 act to revolve the roller 4 within the hub with great facility. If the wheel be a bearing-wheel—as, for instance, in a traction-engine—and the weight of the engine be supported upon the shaft 2, it will be manifest that by reason of its position below the actual center of the wheel that the center of gravity will be correspondingly lowered and the load will be much more steady than if the bearing were at or above the center. In such a case it will be understood that power is simply applied through the sprocket-wheel from above. If the wheel A be represented as an undershot water-wheel, the position of the roller 4 and shaft 2 will be changed to the upper side of the hollow hub, so that the shaft will be nearer to the top of the wheel, and the power being applied to the under side of the wheel will act to rotate the roller and transmit power through it, a suitable connection being made with the wheel for this purpose.

Having thus described my invention, what I claim, and desire to secure by Letters Patent, is—

1. In a device for transmitting power, the combination of a wheel having a hollow hub, disks closing the ends of the hub, a roller of less diameter than the interior of the hub and contained therein at one side of the center thereof, means for applying power to the opposite side of the wheel, and independent guide-rollers within the hollow hub and having shafts turnably mounted in the end disks, said disks forming thrust-bearings to prevent endwise movement of the guide-rollers.

2. In a device for transmitting power, a wheel having a hollow hub, a roller turnable within and in contact with the interior of the hub, said roller being of less diameter than the drum and being located below the center thereof, a bearing-shaft extending into the roller with intermediate antifrictional bearings, guide-rollers journaled within the hub, said rollers being spaced around the inner circumference of the drum and having end journals, disks closing the ends of the drum and having bearings for said journals, and means for transmitting power to the wheel on the opposite side of the center from the bearing-shaft.

In testimony whereof I have hereunto set my hand in presence of two subscribing witnesses.

ENOCH J. LANE.

Witnesses:
S. H. CALLEN,
B. B. FURY.